US011063998B2

(12) United States Patent
Johnson

(10) Patent No.: US 11,063,998 B2
(45) Date of Patent: Jul. 13, 2021

(54) SYSTEM AND METHOD FOR ENERGY MANAGEMENT INFORMATION SYSTEM RELIABILITY ASSURANCE

(75) Inventor: Jeffrey Wayne Johnson, Victoria (CA)

(73) Assignee: SCHNEIDER ELECTRIC USA, INC., Palatine, IL (US)

( * ) Notice: Subject to any disclaimer, the term of this patent is extended or adjusted under 35 U.S.C. 154(b) by 1309 days.

(21) Appl. No.: 13/537,878

(22) Filed: Jun. 29, 2012

(65) Prior Publication Data
US 2014/0006398 A1   Jan. 2, 2014

(51) Int. Cl.
G06F 16/30     (2019.01)
H04L 29/06     (2006.01)
G06Q 50/06     (2012.01)
H02J 13/00     (2006.01)

(52) U.S. Cl.
CPC ........... H04L 65/602 (2013.01); *G06Q 50/06* (2013.01); *H02J 13/0006* (2013.01); *Y04S 10/50* (2013.01)

(58) Field of Classification Search
CPC ........ G06F 17/30592; G06F 17/30595; G06Q 10/10; G06Q 50/06
USPC ........................................................ 707/600
See application file for complete search history.

(56) References Cited

U.S. PATENT DOCUMENTS

| | | |
|---|---|---|
| 5,625,572 A | 4/1997 | Yonekura et al. |
| 7,246,014 B2 | 7/2007 | Forth et al. |
| 2002/0099842 A1* | 7/2002 | Jennings ............... H04L 29/06 709/231 |
| 2003/0177187 A1* | 9/2003 | Levine .................... A63F 13/10 709/205 |
| 2004/0024483 A1* | 2/2004 | Holcombe ............. G06Q 30/02 700/122 |
| 2004/0225648 A1* | 11/2004 | Ransom ................. G06Q 10/10 |
| 2008/0059532 A1 | 3/2008 | Kazmi et al. |
| 2008/0059843 A1 | 3/2008 | Sato et al. |
| 2009/0070168 A1 | 3/2009 | Thompson et al. |
| 2012/0023225 A1* | 1/2012 | Imes ....................... G05B 15/02 709/224 |
| 2012/0065805 A1* | 3/2012 | Montalvo .............. G06Q 10/06 700/297 |
| 2012/0072140 A1* | 3/2012 | Cowan ................... G06Q 50/06 702/60 |
| 2012/0131217 A1* | 5/2012 | Delorme ................. F24F 11/62 709/230 |

OTHER PUBLICATIONS

Manual entitled "PowerLogic ION7300 Series" by Schneider Electric, Copyright 2009.*
Notification of Transmittal of the International Search Report and the Written Opinion of the International Searching Authority from corresponding PCT/US2013/048959 dated Mar. 7, 2014.

* cited by examiner

*Primary Examiner* — Mahesh H Dwivedi
(74) *Attorney, Agent, or Firm* — Lando & Anastasi, LLP

(57) ABSTRACT

Systems and methods for monitoring, logging, and managing data transformations and data streams of energy management (EM) data energy data sources.

20 Claims, 9 Drawing Sheets

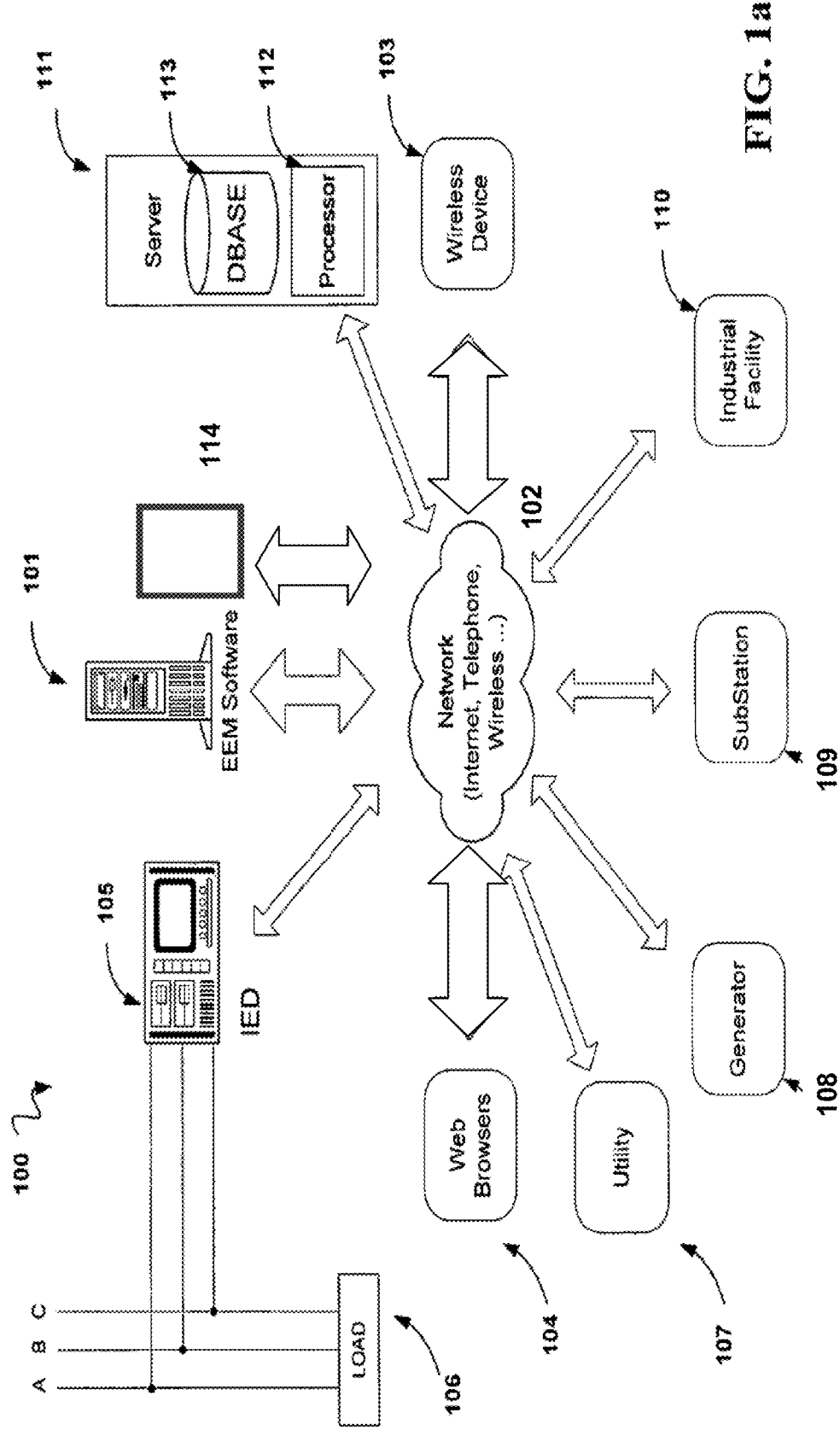

SYSTEM AND METHOD FOR ENERGY MANAGEMENT INFORMATION SYSTEM RELIABILITY ASSURANCE

BACKGROUND

1. Technical Field

Embodiments of the present invention relate generally to energy management.

2. Background Information

Energy management ("EM") systems are delivering the information and control capabilities businesses need to effectively lower energy costs and increase productivity by avoiding power-related disruptions. However, the quality of energy decisions is directly affected by the quality of the data on which these decisions are based.

Managing energy risk requires accurate measurement of the cost, quality and reliability of the power from the source to the load.

An energy management system reduces risk by providing key performance indicators that help managers determine whether critical operating parameters are within expectations. A combination of accurate cost/revenue metering, embedded power quality/reliability monitoring, and a cost-effective Internet-based communications infrastructure delivers relevant information in a timely fashion.

With an EM system, risk can be managed in terms of understanding what is going on, understanding what will happen if a particular action is taken, and helping make decisions to reduce risk, improve profitability, and maximize the return on the energy investment across an entire enterprise.

SUMMARY

Various embodiments of the present invention provide methods, systems, and computer readable media for managing an EM system, EM data, and data transformation components thereof. In aspects of the embodiments present invention, methods are described in terms of systems and apparatuses configured to perform the methods. In aspects of the embodiments, a computer readable medium is provided that configures a computer system to perform the methods described.

In an embodiment, disclosed is an extension component and methods therefor comprising: a module for generating a data transformation record of a data transformation by a data transformation component of an EM information system, the data transformation record comprising a unique identifier for a data stream and a time range for the data being transformed; and an output for sending the data transformation record to a logging database component, wherein the extension component is operatively connected to a data transformation component of the EM information system. The extension component can further comprise: an interface configured to receive a request to regenerate a data stream of a recorded data transformation; and regenerate the requested data stream. The interface can also be configured to output a new data stream.

The extension component can comprise an interface configured to accept user input and enable a user to modify a data transformation performed by the data transformation component. The interface can also be configured to enable a user to reconfigure the data transformation component. The interface can also be configured to enable a user to edit the data transformed by the data transformation component. The extension component can also comprise the interface being configured to respond to a request regarding operational activity of the data transformation. The interface can be configured to respond to a request for at least one of (1) the name of the data transformation component (2) the purpose of the data transformation component, (3) software information, (4) diagnostic information, and (5) status information.

In an embodiment, disclosed is a data transformation logging component and methods therefor comprising: a processing component including at least one interface operatively connected to a data transformation component of an EM system including an extension component, the data transformation logging component being configured to receive and log a data transformation record of a data transformation, the data transformation record comprising a unique identifier for a data stream and a time range for the transformation of the data stream; a log database for storing a log record of the data transformation record; and a processing component configured to process the log record of the data transformations of each data stream. The processing component can be configured to consolidate sequential operations the each data stream into a single record, wherein the single record is configured for use for a data stream trace.

The logging component can further comprise: the log record comprising a log record format that includes fields for a stream id, a time range, component id, an operation id; and a field for tracing one or more data streams, where component id is the unique identifier that describes a component that transforms data. The logging component can also comprise: an interface configured to generate responses to requests about data transformations.

The logging component can further comprise the interface being configured to generate the response to a request comprising a unique identifier for the data stream and a time range for the data stream. The interface can be configured to generate the response comprising a list of components that performed operations on the data stream within the time range and a description of the at least one transformation. The transformation can comprise the transformation of one or more standard system outputs, including at least one of:

a VEE (Validation, Estimation and Editing)/data cleansing operation transformation;
an aggregation/disaggregation transformation;
an arithmetic and logical transformation;
a manual modification transformation;
a reclassification transformation;
a packaging-related transformation;
a data-management transformation;
a transformation output identified after system deployment,
a transformation by a custom component, and
a transformation by an external system or component.

In an embodiment, disclosed is a data trace ID generator and decoder component and methods therefor comprising: an interface configured to generate a reference ID configured to be used an input to request data trace comprising: a unique identifier of an EM component producing a system output; a unique name identifier that represents a content of the system output; the time the content was produced; and at least one data stream and time range for data processed by the EM component. The data trace ID generator and decoder can comprise: a decoder for decoding the reference ID into the inputs to build a data stream trace.

In an embodiment, disclosed is a system for adding metadata to an EM data stream and methods therefor including: a component for adding metadata to a data stream, wherein the metadata provides information about at least one of: data origin, data quality, data processing, and a data storage rule. The metadata can comprise at least one of: a quality flag; a device communication parameter; a data origin; a source algorithm; and stream meta-data. The metadata can comprise at least one of: stream metadata added to augment a presentation for a data path trace visualization tool.

In an embodiment, disclosed is a computer system and methods therefor including at least one computer processor and computer readable storage medium or media including computer code and at least one storage device in which is stored EM data for a plurality of EM devices, the system comprising: a memory including an EM database including records of a data transformations transmitted from a plurality of data transformation components of EM devices; and one or more processors programmed at least to receive and log the data transformation record EM transformation data transmitted from the plurality of EM devices; store, in the memory operatively coupled to at least one of the processors, the EM log data; and provide, for a graphic user interface, an interactive display configured to display a graphic representation of a data stream trace based on the EM log data. The system can comprise: a first visualization tool to show the data stream trace; and at least one second tool configured to be accessible from the first visualization tool. The system can comprise: an EM information system graphic user interface; and wherein the first visualization tool is configured to be launched from the EM information system graphic user interface.

The system can comprise at least one of: an interface for user input of a reference ID to load information about a previous output and launch of visualization and editing tools. The interface can be configured to regenerate at least one data output and display the data output along with a previous data output. The interface can be configured to display a visualization of a selected EM data output for editing; and an interface for responding to request for information about transformation logic associated with a selected output. The system can be configured such that the first visualization tool is a stand-alone tool. The system can be configured such that the graphic user interface is configured to include an interface comprising a Reference ID input generated by a Reference ID generator, wherein the Reference ID input is configured to access the data stream trace.

The system can be configured such that at least one second visualization tool is configured to at least provide additional details on a data stream, allow modifications to a data transformation, or both. The system can be configured to display information about the data stream trace, comprising at least one of: general EM data about a data stream through an EM system, and EM data for at least one specific transformation of EM data. The system can be configured to display at least one of: a data source of the data; storage location data; and data processing information.

The system can be configured to include an interface for modification of the configuration of at least one data processing step. The modification can include at least one of:
    altering data stream metadata;
    modifying a data cleansing function;
    modifying a data processing calculation;
    selecting an algorithm selection;
    modifying a data storage parameter; and
    modifying a data processing parameter.
The system can be configured to allow an update to a visualization based on the modification.

In an embodiment, disclosed is a method implemented by at least one computer upon executing programming code stored on at least one non-transitory computer-readable medium, the method comprising: logging each data transformation of an energy management (EM) data stream, wherein the log of the transformation event includes a unique identifier for the data stream; classifying the data transformation event according to a classification scheme; storing the data transformation log in a log database, wherein the log database comprises logs of each data transformation of the data stream, which are configured such that they can be used for a data stream trace.

Systems according to some embodiments may comprise at least one computer, at least one storage device in which is stored EM data, and at least one non transitory computer readable medium storing thereon computer code which when executed by the at least one computer causes the at least one computer to be operable in executing a method according to one or more of the embodiments summarized above.

Some embodiments provide at least one non-transitory computer readable medium that stores programming code that when executed by at least one computer, instructs the at least one computer to execute a method according to one or more of the embodiments summarized above.

Throughout the specification and claims, the following terms take at least the meanings explicitly associated herein, unless the context dictates otherwise. The meanings identified below do not necessarily limit the terms, but merely provide illustrative examples for the terms. The phrase "an embodiment" as used herein does not necessarily refer to the same embodiment, though it may. In addition, the meaning of "a," "an," and "the" include plural references; thus, for example, "an embodiment" is not limited to a single embodiment but refers to one or more embodiments. Similarly, the phrase "one embodiment" does not necessarily refer the same embodiment and is not limited to a single embodiment. As used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise.

It is noted that in this disclosure and particularly in the claims and/or paragraphs, terms such as "comprises," "comprised," "comprising," and the like can have the meaning attributed to it in U.S. patent law; that is, they can mean "includes," "included," "including," "including, but not limited to" and the like, and allow for elements not explicitly recited. Terms such as "consisting essentially of" and "consists essentially of" have the meaning ascribed to them in U.S. patent law; that is, they allow for elements not explicitly recited, but exclude elements that are found in the prior art or that affect a basic or novel characteristic of the invention. Embodiments of the present invention are disclosed or are apparent from and encompassed by, the following description.

It will be appreciated by those skilled in the art that the foregoing brief description and the following detailed description are exemplary (i.e., illustrative) and explanatory of the present invention, but are not intended to be restrictive thereof or limiting of the advantages which can be achieved by this invention in various implementations. Additionally, it is understood that the foregoing summary and ensuing detailed description are representative of some embodiments of the invention, and are neither representative nor inclusive of all subject matter and embodiments within the scope of the present invention. Thus, the accompanying drawings, referred to herein and constituting a part hereof, illustrate embodiments of this invention, and, together with the detailed description, serve to explain principles of embodiments of the invention.

BRIEF DESCRIPTION OF DRAWINGS

Aspects, features, and advantages of some embodiments of the invention, both as to structure and operation, will be understood and will become more readily apparent when the invention is considered in the light of the following description made in conjunction with the accompanying drawings, in which like reference numerals designate the same or similar parts throughout the various figures, and wherein:

FIGS. 1a-1e describe an Energy Management system and Energy Management system display interfaces.

DETAILED DESCRIPTION

Figure 1B:
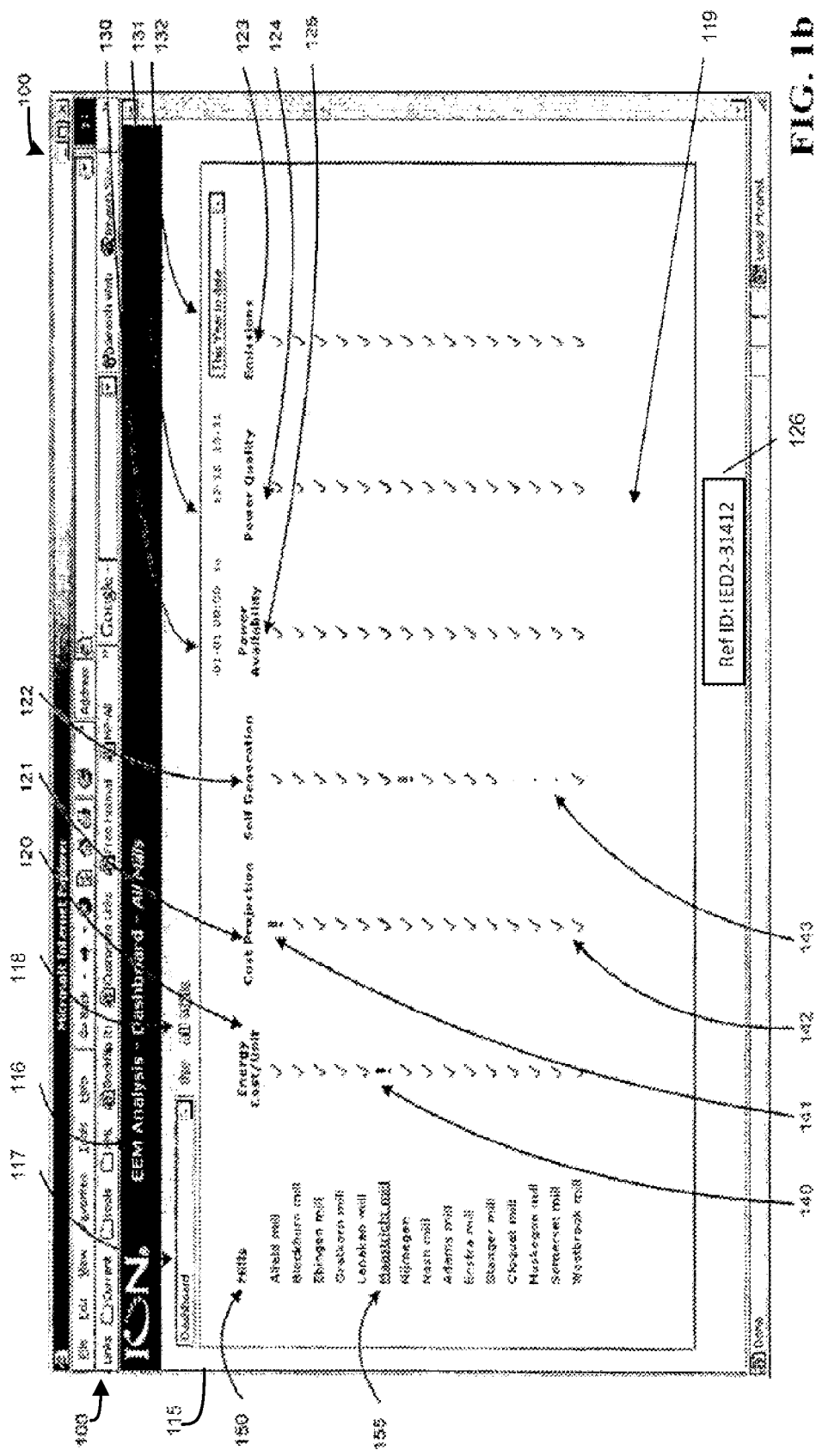

A large Energy Management ("EM") system such as an Enterprise Energy Management ("EEM") system typically comprises a network of web-enabled software and intelligent metering and control devices, as well as other inputs. (The terms EM system, EEM system, and EM information system are used interchangeably throughout this disclosure.) A system can track all forms of utilities consumed or generated, including electricity and gas, as well as water, compressed air and steam. Data can be gathered from the utility billing meters or other meters positioned at each service entrance, from tenant or departmental sub-meters, and from instruments that are monitoring the conditions of equipment such as generators, transformers, breakers, and power quality mitigation equipment. Other inputs can include weather information, real-time pricing information, occupancy rates, emissions data, consumption and condition data from building automation systems, production data from enterprise resource planning (ERP) systems, and other energy-related data.

EM systems generate complex Key Performance Indicators (KPIs) that drive significant business decisions. Accordingly, user visibility of KPIs for how a system is functioning allows for greater confidence in system outputs. For example, when a problem is identified, support personnel are able inspect each part of an EM data pathway in the system and understand where data is coming from, how it is being manipulated (without having intimate knowledge of the system, access to source code, etc).

The following features and components are discussed herein.

A data stream or EM data stream refers to a series of one or more data values, as for example, classified by a name typically referring to origin or purpose of the data and/or other metadata such as type.

Components described in this disclosure identify data by using a reference comprising a data stream ID and a time range, where a data stream ID is a reference that uniquely identifies each data stream in an EM information system.

A data stream trace refers to a visualization that shows the transformations and movements of one or more data streams from an EM data origin source (e.g., a sensor or intelligent energy device) to a terminus point, such as presentation on a user interface.

An EM output or standard system output: refers to standard outputs from an EM information system, including but not limited to reports and visualizations, trends, alerts, events, and KPIs. Exemplary non-limiting standard system outputs include:
  A VEE (Validation, Estimation and Editing)/data cleansing operation,
  transformation,
  an aggregation/disaggregation transformation,
  an arithmetic and logical transformation,
  a manual modification transformation,
  a reclassification transformation,
  a packaging-related transformation,
  a data-management transformation,
  a transformation output identified after system deployment,
  a transformation by a custom component, and
  a transformation by an external system or component.

A standard data visualization component refers to standard EM information system component that produces standard system outputs.

An EM data transformation component refers to a standard EM information system component that transforms data in some way.

An interface refers to, in a general sense, an API (application programming interface) on a component that allows other components in a software system to make requests. Embodiments described in this disclosure are shown as a Web Services (WS) type interfaces, although it will be understood that other interfaces can be implemented.

As will be understood, data streams begin existence at the hardware level for complex devices, and at the software layer for simple sensors or logical data streams.

The EM system architecture described herein is appropriate for large/dynamic systems (e.g., such as EEM systems) because new components that modify data simply need to implement the appropriate interfaces.

A directory service as is well known to those of ordinary skill in the art are standard part of service-oriented architecture and is also understood to be provided for EM data transformation components to be contacted as described herein.

Components of typical database system will transform data and are subject to the extensions required for all EM data transformation components; for this disclosure these are logically separated from the database objects in illustrations for simplicity and easier understanding.

Referring to FIG. 1a, disclosed embodiments of the EM system include an illustrative EM software system 100, described herein as an EEM software system 100, that may collect data from various types of EEM data sources and create useful information based on that data. A description of such a system and user interfaces therefor may be found in U.S. Patent Publication. No. 2004/0225648 A1, the entirety of which is incorporated by reference hereby. The EEM software system 100 may also allow a user to perform what-if analysis, make changes in their system, and verify results based on the changes. As illustrated, the EEM software system 100 may include an EEM software server 101 that may be coupled with a network 102. As used herein, the network 102 should be broadly construed to include any one or more of a number of types of networks that may be created between devices using an Internet connection, a LAN/WAN connection, a telephone connection, a wireless connection, and so forth.

Each of the terminals, servers, and systems may be, for example, a server computer or a client computer or client device operatively connected to network 102, via bi-directional communication channel, or interconnector, respectively, which may be for example a serial bus such as IEEE 1394, or other wire or wireless transmission medium. The terms "coupled with," "operatively connected," "operatively coupled," and "communicatively coupled", as used herein, mean that the elements so connected or coupled are adapted to transmit and/or receive data, or otherwise communicate. This connection/coupling may or may not involve additional transmission media, or components, and may be within a single module or device or between the remote modules or devices. The terms "connected" and "coupled" thus include directly connected to or indirectly connected through one or more intermediate components. Such intermediate components may include both hardware and software based components.

The terminals, servers, devices, and systems are adapted to transmit data to, and receive data from, each other via the network 102. The terminals, servers, and systems typically utilize a network service provider, such as an Internet Service Provider (ISP) or Application Service Provider (ASP) (ISP and ASP are not shown) to access resources of the network 102.

Although each of the above described terminal, server, and system may comprise a full-sized personal computer, the system and method may also be used in connection with mobile devices capable of wirelessly exchanging data with a server over a network such as the Internet. For example, a terminal, client device or user device may be a wireless-enabled PDA such as an iPhone, an Android enabled smart phone, a Blackberry phone, or another Internet-capable cellular phone.

It should be appreciated that a typical system can include a large number of connected computers (e.g., including server clusters), with each different computer potentially being at a different node of the network 102. The network, and intervening nodes, may comprise various configurations and protocols including the Internet, World Wide Web, intranets, virtual private networks, wide area networks, local networks, private networks using communication protocols proprietary to one or more companies, Ethernet, WiFi and HTTP, cloud and cloud based services, and various combinations of the foregoing. Such communication may be facilitated by any device capable of transmitting data to and from other computers, such as modems (e.g., dial-up, cable or fiber optic) and wireless interfaces.

A plurality of Intelligent Electronic Devices ("IEDs") 105 may be coupled with the EEM software server 101. The IEDs 105 may be coupled with a load 106, which the IEDs 105 are responsible for monitoring and reporting various types of energy data related to the load 106. IEDs 105 may include revenue electric watt-hour meters, protection relays, programmable logic controllers, remote terminal units, fault recorders and other devices used to monitor and/or control electrical power distribution and consumption. IEDs 105 are widely available that make use of memory and microprocessors to provide increased versatility and additional functionality. Such functionality includes the ability to communicate with other hosts and remote computing systems through some form of communication channel. IEDs 105 also include legacy mechanical or electromechanical devices that have been retrofitted with appropriate hardware and/or software allowing integration with the EEM system.

An IED 105 may be associated with a particular load or set of loads that are drawing electrical power from the power distribution system. The IED 105 may also be capable of receiving data from or controlling its associated load. Depending on the type of IED 105 and the type of load it may be associated with, the IED 105 may implement an energy management function that is able to respond to, implement and/or generate further management functions, measure energy consumption, control energy distribution such as a relay function, monitor power quality, measure energy parameters such as phasor components, voltage or current, control energy generation facilities, compute revenue, control electrical power flow and load shedding, or combinations thereof. For functions which produce data or other results, the IED 105 may push the data onto the network 102 to another IED 105, data output device or back end server/database, automatically or event driven, or the IED 105 can wait for a polling communication which requests that the data be transmitted to the requestor.

For the purposes of the disclosed illustrative embodiments, a computer or computing device may be broadly defined as a device which comprises a processing unit and includes, but is not limited to, personal computers, terminals, network appliances, Personal Digital Assistants ("PDAs"), IEDs, wired and wireless devices, tablet personal computers, game boxes, mainframes, as well as combinations thereof as are presently available or later developed.

Figure 2:
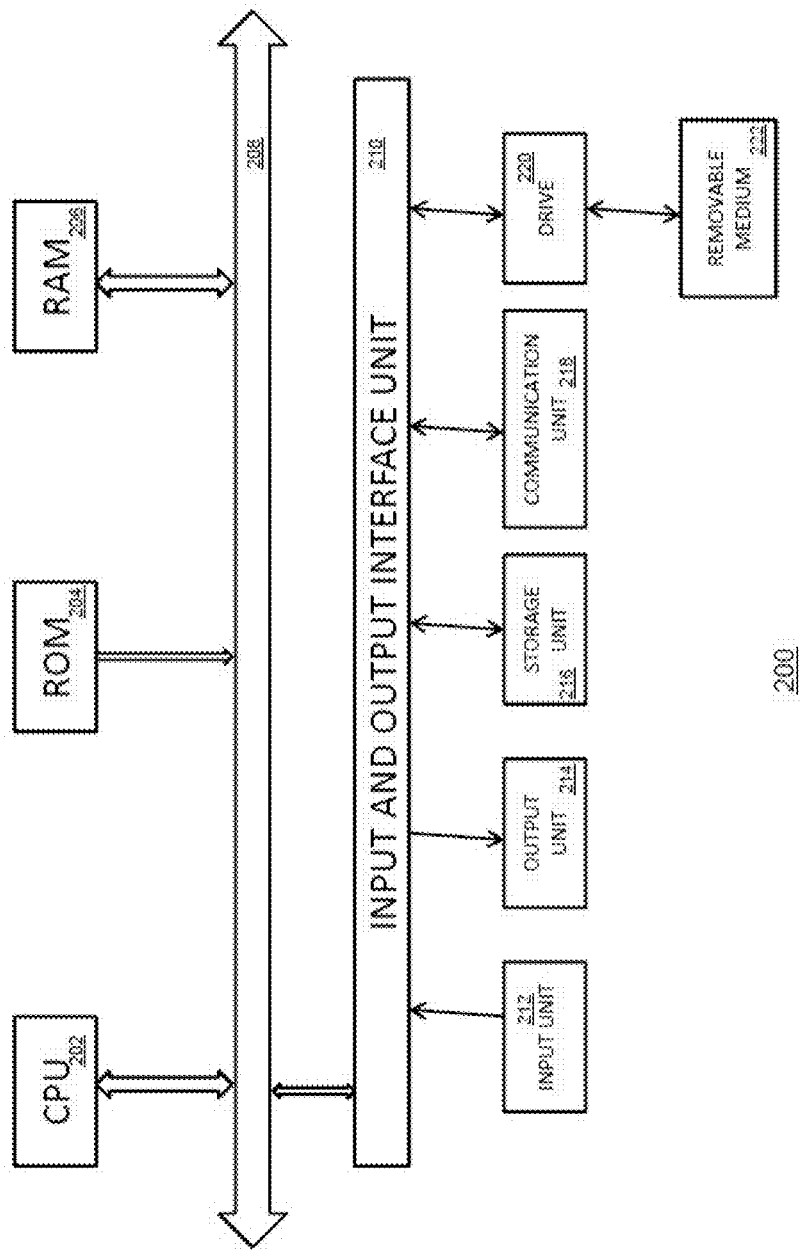
FIG. 2 illustrates an exemplary structure of a server, system, or a terminal according to an embodiment.

FIG. 2 illustrates an exemplary structure of a server, system, or a terminal according to an embodiment. The exemplary server, system, or terminal 200 includes a CPU 202, a ROM 204, a RAM 206, a bus 208, an input/output interface 210, an input unit 212, an output unit 214, a storage unit 216, a communication unit 218, and a drive 220. The CPU 202, the ROM 204, and the RAM 206 are interconnected to one another via the bus 208, and the input/output interface 210 is also connected to the bus 208. In addition to the bus 208, the input unit 212, the output unit 214, the storage unit 216, the communication unit 218, and the drive 220 are connected to the input/output interface 210.

The CPU 202, such as an Intel Core™ or Xeon™ series microprocessor or a Freescale™ PowerPC™ microprocessor, executes various kinds of processing in accordance with a program stored in the ROM 204 or in accordance with a program loaded into the RAM 206 from the storage unit 216 via the input/output interface 210 and the bus 208. The ROM 204 has stored therein a program to be executed by the CPU 202. The RAM 206 stores as appropriate a program to be executed by the CPU 202, and data necessary for the CPU 202 to execute various kinds of processing.

A program may include any set of instructions to be executed directly (such as machine code) or indirectly (such as scripts) by the processor. In that regard, the terms "instructions," "steps" and "programs" may be used interchangeably herein. The instructions may be stored in object code format for direct processing by the processor, or in any other computer language including scripts or collections of independent source code modules that are interpreted on demand or compiled in advance. Functions, methods and routines of the instructions are explained in more detail below.

The input unit 212 includes a keyboard, a mouse, a microphone, a touch screen, and the like. When the input unit 212 is operated by the user, the input unit 212 supplies an input signal based on the operation to the CPU 202 via the input/output interface 210 and the bus 208. The output unit 214 includes a display, such as an LCD, or a touch screen or a speaker, and the like. The storage unit 216 includes a hard disk, a flash memory, and the like, and stores a program executed by the CPU 202, data transmitted to the terminal 200 via a network, and the like.

The communication unit 218 includes a modem, a terminal adaptor, and other communication interfaces, and performs a communication process via the network(s) described herein.

A removable medium 222 formed of a magnetic disk, an optical disc, a magneto-optical disc, flash or EEPROM, SDSC (standard-capacity) card (SD card), or a semiconductor memory is loaded as appropriate into the drive 220. The drive 220 reads data recorded on the removable medium 222 or records predetermined data on the removable medium 222.

One skilled in the art will recognize that, although the data storage unit 216, ROM 204, RAM 206 are depicted as different units, they can be parts of the same unit or units, and that the functions of one can be shared in whole or in part by the other, e.g., as RAM disks, virtual memory, etc. It will also be appreciated that any particular computer may have multiple components of a given type, e.g., CPU 202, Input unit 212, communications unit 218, etc.

An operating system such as Microsoft Windows 7®, Windows XP® or Vista™, Linux®, Mac OS®, or Unix® may be used by the terminal. Other programs may be stored instead of or in addition to the operating system. It will be appreciated that a computer system may also be implemented on platforms and operating systems other than those mentioned. Any operating system or other program, or any part of either, may be written using one or more programming languages such as, e.g., Java®, C, C++, C#, Visual Basic®, VB.NET®, Perl, Ruby, Python, or other programming languages, possibly using object oriented design and/or coding techniques.

Data may be retrieved, stored or modified in accordance with the instructions. For instance, although the system and method is not limited by any particular data structure, the data may be stored in computer registers, in a relational database as a table having a plurality of different fields and records, XML documents, flat files, etc. The data may also be formatted in any computer-readable format such as, but not limited to, binary values, ASCII or Unicode. The textual data might also be compressed, encrypted, or both. By further way of example only, image data may be stored as bitmaps comprised of pixels that are stored in compressed or uncompressed, or lossless or lossy formats (e.g., JPEG), vector-based formats (e.g., SVG) or computer instructions for drawing graphics. Moreover, the data may comprise any information sufficient to identify the relevant information, such as numbers, descriptive text, proprietary codes, pointers, references to data stored in other memories (including other network locations) or information that is used by a function to calculate the relevant data.

It will be understood by those of ordinary skill in the art that the processor and memory may actually comprise multiple processors and memories that may or may not be stored within the same physical housing. For example, some of the instructions and data may be stored on removable memory such as a magneto-optical disk or SD card and others within a read-only computer chip. Some or all of the instructions and data may be stored in a location physically remote from, yet still accessible by, the processor. Similarly, the processor may actually comprise a collection of processors which may or may not operate in parallel. As will be recognized by those skilled in the relevant art, the terms "system," "terminal," and "server" are used herein to describe a computer's function in a particular context. A terminal may, for example, be a computer that one or more users work with directly, e.g., through a keyboard and monitor directly coupled to the computer system. Terminals may also include a smart phone device, a personal digital assistant (PDA), thin client, or any electronic device that is able to connect to the network and has some software and computing capabilities such that it can interact with the system. A computer system or terminal that requests a service through a network is often referred to as a client, and a computer system or terminal that provides a service is often referred to as a server. A server may provide contents, content sharing, social networking, storage, search, or data mining services to another computer system or terminal. However, any particular computing device may be indistinguishable in its hardware, configuration, operating system, and/or other software from a client, server, or both. The terms "client" and "server" may describe programs and running processes instead of or in addition to their application to computer systems described above. Generally, a (software) client may consume information and/or computational services provided by a (software) server.

Returning to FIG. 1a, the EEM software server 101 may be coupled with a utility 107, a generator 108, a substation 109, and an industrial facility 110 and so forth. The entities 107-110 may record and report various types of EEM data that is sent to the EEM software server 101 as set forth in greater detail below. In addition, as used herein, the entities 107-110 should be construed to include various types of computer workstations located at these types of facilities that may connect with and use the EEM software application that is located on the EEM software server 101. Similarly, the EEM software server 101 may be coupled with one or more other computer devices 114 including user/machine interfaces that may connect with and use the EEM software application that is located on the EEM software server 101. As such, as referred to herein, the devices 107-110 should be construed broadly to include various different types of computing devices that may transfer various types of energy consumption data to the EEM software server 101, as well as access the EEM software server 101 to use the EEM software application located thereon.

The EEM software server 101 may be coupled with one or more wireless devices 103. The wireless devices 103 may be IEDs, cellular telephones, or any other device that is capable of communicating wirelessly. The wireless devices 103 may transmit data to and/or receive data from EEM software server 101.

The EEM software server 101 may be coupled with one or more web browsers 104. The web browsers 104 may run on any computing device, and may access an EEM software application located on the EEM software server 101.

The EEM software server can also be coupled with other human-machine interfaces 114 such as thick-clients, cloud based services (e.g. via network 102), or any other potential data sources.

As illustrated in FIG. 1a, the EEM software server 101 may be coupled with a database server 111. The database server 111 may include a processor 112 that is programmed to interpret and process incoming data from any of the devices or entities that are coupled with the EEM software system 100. The database server 111 may include a database 113 that is designed to store various types of data that may be used by the EEM software system 100. The various types of devices or entities that are coupled with the EEM software system 100 may be designed to transfer EEM data to the database server 111, which may then be retrieved and used by the EEM software system 100. As such, as used herein, the database server 111 should be construed broadly as any type of device that is designed to receive and store data that may be used and accessed by the EEM software application, and as such may be part of EEM software server 101, or may be located on a separate device 111.

In some of the disclosed embodiments, EEM system components may share EEM data with one another. While one illustrative embodiment of the EEM software system 100 is depicted in FIG. 1a, it can be appreciated that an EEM system can be scaled out to include additional external data sources, or scaled down to include only internal data sources, such as only communications or data within a geographic location or area. It can also be appreciated that an EEM software system can accept data from local EEM software systems, such as in EEM monitoring service that accepts data from a local EEM server. For example a high level view of an exemplary system architecture, according to one embodiment, is described in U.S. patent application Ser. No. 11/899,809 (published as U.S. Patent Publication No. 2009/0070168) entitled Enterprise Energy Management System with Social Network Approach to Data Analysis, the entirety of which is hereby incorporated by reference. The architecture includes an enterprise energy management service, a social data analysis service, a data source, and at least two local area networks coupled together via a wide area network 102.

As described herein, EEM data may include, but is not limited to, electrical operation data such as volts, amps, status, power; power quality data such as harmonics, power factor, reliability (such as number of nines), disturbance data; consumption data such as energy and demand; event data such as set point actions, status changes and error messages; financial data such as energy cost, power factor penalties, revenue data, billing data such as tariffs for water, air, gas, electricity and steam; environmental data such as temperature, pressure, humidity and lightning/atmospheric disturbance data; water-air-gas-electric-steam ("WAGES") data; configuration data such as frameworks, firmware, software, calculations involving EEM data and commands; and aggregated data, where at least one energy management datum is combined with other data points. For the purposes of this application, combined data may include aggregated data and computed data.

The data sources 103-110, 114 in FIG. 1a may represent possible sources of data streams. A data source may include data sources (e.g. web services) that offer EM attribute data including data relevant to the analysis of energy use. One example of such relevant data might be the hourly ambient temperature readings offered by a weather service company. Other examples include financial market data, local news data, national news data, and world news data. Other data sources not listed above may also be included in addition to those already stated.

A common logical architecture for an enterprise energy management monitoring system at a typical installation, which may be physically located across one or more geographic regions. Several intelligent electronic devices (IEDs) 105 may be attached at various points of one or more energy distribution networks such as electric, gas, steam, etc. The EEM server 101 may collect data from at least one of the data sources 103-110 via the IEDs 105. The IEDs 105 may push the data to the EEM server 101 or the EEM server 101 may periodically poll the data sources for updates, or a combination of both. The EEM server 101 validates and processes the data and presents the data to one or more users at the site such as a system user. A system user may view the data provided by EEM server 101 using laptop computer or other device (not shown).

Referring now to FIG. 1b, a sample EEM Analysis screen, i.e. Graphical User Interface ("GUI") 115 is illustrated that may be generated by the EEM software application on the EEM software server 101. A description of user interfaces useable with the embodiments of the present disclosure may be found in U.S. Patent Publication. No. 2004/0225648 A1, the entirety of which is incorporated by reference hereby. The EEM Analysis GUI 115 may depict EEM data in different formats, including both graphical and textual formats. A title bar 116 may be used to identify which EEM Analysis GUI 115 is depicted, providing a quick reference point for the user to establish context. An EEM Analysis selection field or control 117 allows the user to select what type of analysis they wish to create and view. In this example, a Dashboard option has been selected in the EEM Analysis control 117. The Dashboard may provide a single overview of the EEM software system 100, allowing a user to identify what is going on in the EEM software system 100 at a very high level. A description 118 (All Mills) may be provided to indicate what series or EEM system the EEM Analysis control 117 relates to. The description 118 could also be provided as a selection field.

The EEM Analysis GUI 115 may include a table 119 that sets forth various types of EEM data. The first column of the table 119 may set forth a plurality of operational units of interest 150, which could be departments, branches, physical locations, and so forth. Each row of the table 119 relates to a respective one of these operational units of interest 150, indicating the status of several categories or key performance indicators 120-125. The key performance indicators 120-125 can be energy cost/unit 120, cost projection 121, self generation 122, power availability 125, power quality 124, emissions 123, or other values based on the user needs and the set-up of the EEM software system 100.

For each operational unit of interest 150 and each key performance indicator 120-125, the EEM software system 100 may be configured with certain criteria indicating what is normal. Each cell in table 119 may have a symbol indicating the status of that key performance indicator 120-125 at that operational unit 150. In this example, normal performance may be indicated with a check mark, as illustrated at cell 142. Problem areas, for example where a set point or other operational guideline has been violated, may be indicated with an exclamation mark, as illustrated at cells 140, 141. When a certain key performance indicator 120-125 does not apply to an operational unit of interest 150, this may be marked with a dash, as illustrated at cell 143. It will be appreciated that various other symbols could be used to indicate these marks 140-143. Marks 140-143 allow a user to quickly identify which areas of interest are operating within the preset criteria and which areas are not. The marks 140-143 can be hyperlinked, allowing the user to click on them and drill down into other screens for further detail including for details on data transformation components as described below. In this way the user is able to analyze and manage their EEM system.

The operational unit 155 may be underlined, indicating that a hyperlink exists, allowing a user to click on the link and view a screen, possibly a web page, with performance indicators and other related data, such as weather, about operational unit 155. The time frame that the marks 140-143 are valid for is indicated at 130-132. The date-time selection field or control 132 may allow the user to select a date-time range they are interested in, such as the current day, this week, last week, last month, year to date, month to date and so forth. The exact date-time range currently being displayed is indicated at 130-131.

Embodiments described herein comprise components and features configured to augment a standard EM system. EM systems generate complex Key Performance Indicators (KPIs) that drive significant business decisions. Accordingly, user visibility of KPIs and for how the EM system generates KPIs allows for greater confidence in system outputs. For example, when a problem is identified, such as when a KPI or data visualization appears suspect for instance, support personnel are able inspect each part of an EM data pathway in the system and understand where data is coming from, how it is being manipulated (without having intimate knowledge of the system, access to source code, etc). Described are embodiments including:

(a) Extensions to standard data transformation components configured to enable logging and modification of data transformations throughout the system, regardless of the type of operation or component making the transformations;
(b) A data transformation logging component configured to record and store which data streams are transformed, by which component and the type of transformation applied;
(c) An updatable list of possible of data transformations comprising a classification scheme that describes data transformations;
(d) a data trace reference ID generator/decoder configured to generate reference IDs that can be displayed along with standard system outputs and decode reference IDs into a request that can be used to build a data stream trace;
(e) Extensible data stream meta-data system configured to provides context on data streams, allowing them to be tagged with relevant information;
(f) Visualization and editing tools coupled to the logging component and configured to visualize the data stream trace and enable a user of the system to modify the configuration of data transformation components; and
(g) Extensions to standard data visualization components configured to enable a user to enter a reference ID to load information about a previous output and launch the visualization and editing tools, as well as to regenerate standard system outputs and display them side-by-side with previous outputs.

Figure 3A:
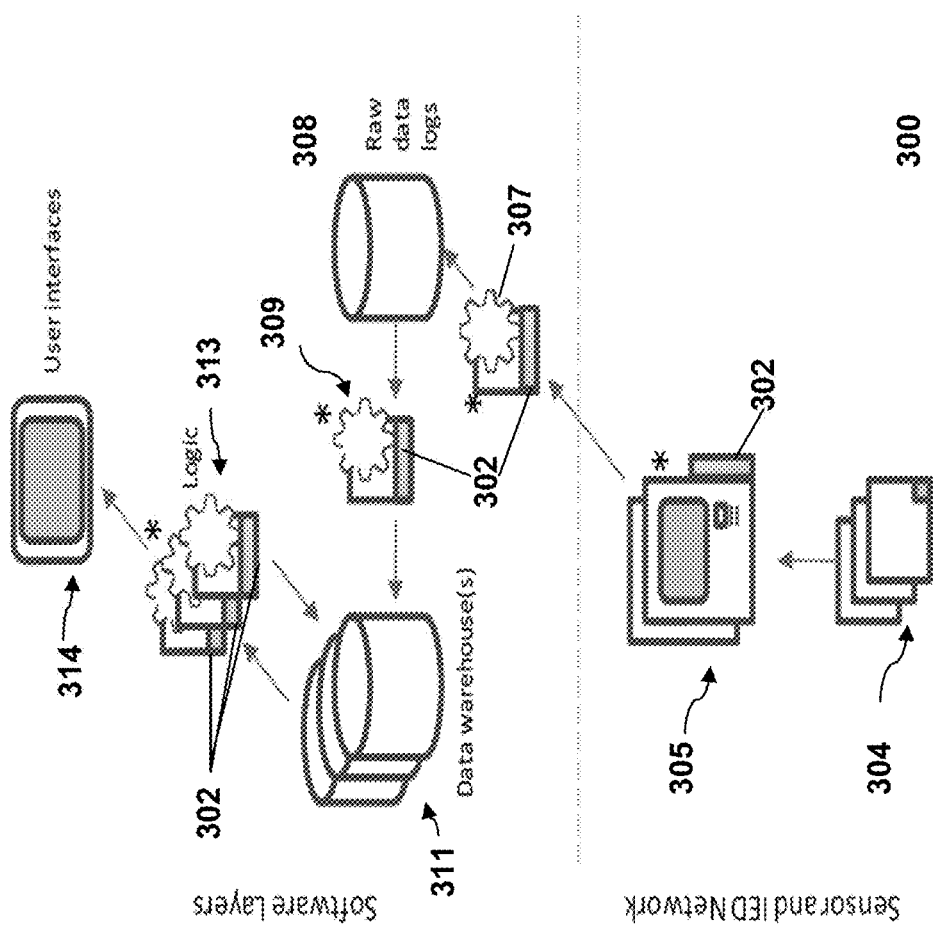
FIGS. 3a and 3b illustrate an exemplary high level flow and architecture for processing and displaying Energy Management data.

FIG. 3a illustrates an architectural flow showing data transformation points across an EM information system 300. As illustrated therein, solid arrows indicate a typical data flow for EM data from the sensor and IED network to software architecture layers. Asterisks illustrate a point of possible data transformation by an EM system data component. IEDs 305 or sensors (or other data feed sources) 304 as well as software components 307, 309, 313 are coupled to extension components 302 as described herein. Although EM information system 300 components are illustrated in a single view, they may in practice be distributed geographically or logically across networks (local, intranet, extranet, internet) as described herein. Standard EM information system 300 components illustrated include: a database that stores raw data logs 308 (data as it is read from an IED 305 or sensor 305); components that transform data using predefined logic 307, 309, 313, or by accepting user input, or inputs from other systems; data warehouse(s) 311 that store the transformed data; and EM information system user interfaces 314 that present standard system outputs.

As described in further detail below with respect to FIG. 3b, any data transformation that is possible to log can be recorded in a data transformation log component 315.

Extension Components

In one embodiment an extension component 302 comprises: a module for generating a data transformation record of a transformation of data by a data transformation component of an EM information system, the record comprising a unique identifier for a data stream and a time range for the transformation of the data; and an output for sending the data transformation record to a log component, wherein the extension component is operatively connected to a data transformation component of an EM information system. The extension component also comprises an interface configured receive a request to regenerate a data stream of a recorded data transformation and regenerate the requested data stream. The interface can also be configured to respond to a request regarding operational activity of the data transformation.

Thus the extension component is configured to comprise: at least one interface configured to execute at least one of: regenerate the data stream of a recorded data transformation, output a new data stream, accept user input to enable a user to correct a data transformation error, enable a user to reconfigure the data transformation component, enable a user to edit the data transformed by the data transformation component, respond to a request regarding the operational activity of the data transformation component, and respond to a request for at least one of (1) the name of the data transformation component (2) the purpose of the data transformation component, (3) software information, (4) diagnostic information, and (5) status information.

Accordingly, in certain embodiments an extension component for a standard data transformation component is configured to comprise:
 i. an interface that provides a self-identifying standard unique identifier/reference ID;
 ii. an interface that can respond to reliability and quality related requests;
 iii. functionality that notifies a data transformation logging component when a data for a data stream is transformed;
 iv. an interface that can respond to requests to regenerate outputs, including to create a new output data stream;
 v. an interface for requesting a user interface to be displayed to enable an operator to modify the configuration of the transformation component (or in the case of a component that allows direct editing of data, to display such an editor); and
 vi. an interface that can respond to reliability and quality related requests with information such as:
  1. the name and purpose of the data transformation component,
  2. software version information, and
  3. diagnostics and status information.

Extension components can be added to any component in the system that transforms data in order to provide traceability, inspection, and to facilitate corrections/updates, including the following non-limiting list of exemplary types of data transformations based on standard outputs:
 i. VEE (Validation, Estimation and Editing)/data cleansing operation types
 ii. Aggregation/disaggregation types
 iii. Arithmetic and logical types
 iv. Manual modification types
 v. Reclassification types (relabeling or reclassifying data, including to a new data stream)
 vi. Packaging related types (possible changes to data due to protocol translation, data format conversions, etc)
 vii. Data management types (removal of data, archiving of data, etc)

viii. Any additional types identified after a system deployment, for example, from custom components, types from other systems, etc.

As will be appreciated, such a list of data transformations can be updateable, and could implemented as a list accessible directly by components in the system or managed by a service oriented component. As new data transformation components are integrated into an EM system, the service can be utilized to register new transformation types that the transformation component performs. As will be further be appreciated, in order to provide data trace information, the transformation classifications are configured to allow the system to provide coherent and consistent descriptions of types of transformations occurring in the system.

As described below, extensions for standard data visualization components can be configured to provide details on transformations associated with a given standard system output.

Data Transformation Log Component

Figure 3B:
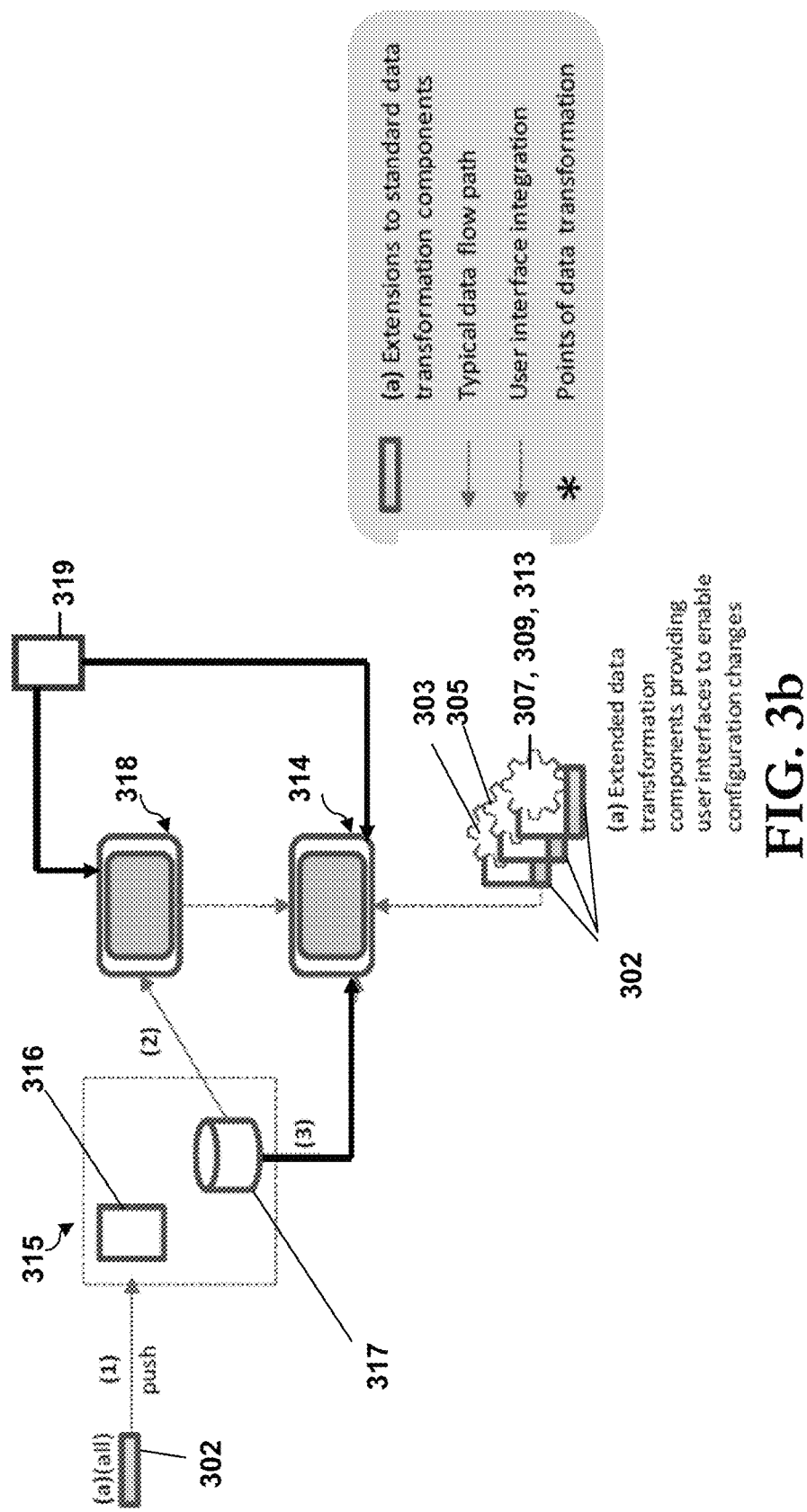

FIG. 3b illustrates an architectural flow showing data transformation points comprising extension components 302 configured to transmit a record of transformation to a data transformation log component 315, for example by push messaging, whereas dashed arrows indicate a user-interface integration with the EM information system. Also shown are visualization and editing tools 318 which are configured to integrate with the EM information system user interfaces 314 that present standard system outputs. Transformation records from the data transformation log component 315 are configured to produce end-user visualizations on a graphic user interface via visualization and editing tools 318, which are configured to aid in analysis of system correctness, as described herein. For example, logged transformations from the data transformation log component 315 information may also be displayed in a standard EM user interface.

In one embodiment, all components of an EM system that transform data are coupled or otherwise include the extension component 302 and are configured to send a record of a data transformation to the data transformation log component 315. Data transformation records from the data transformation log component 315 are coupled with the visualization and editing tools 318.

In one embodiment, the data transformation logging component 315 comprises: a processing component 316 including at least one interface operatively connected to a data transformation component of an EM system 300 including an extension component 302. In an embodiment, an extension component connects via an interface to the data logging component and is configured to receive and log a data transformation record of a data transformation, the data transformation record comprising a unique identifier for a data stream and a time range for the transformation of the data stream; a log database 317 for storing a log record of data transformation record; and a processing component 316 configured to process the log record of the data transformations of each data stream. The processing component 316 of the logging component 315 is configured to consolidate sequential operations of each data stream into a single record to, inter alia, minimize data storage requirements and simplify data transformation record retrieval. For example in one embodiment, the log component 315 comprises:

i. an interface that can receive information on data transformations, and ii. functionality that consolidates sequential operations on the same data stream into a single record to, for example, minimize data storage requirements and simplify reporting.

In one embodiment, a single record in the log database 317 includes a unique identifier for the data stream and a time range for the data stream. Also included can be a list of components that performed operations on the data stream within the time range and a description of the at least one transformation. An example of log format is: [stream id][time range][component id][transformation id: operands: one or more stream ids], where the component id is the unique identifier that describes any component that transforms data and the transformation id refers to a specific data transformation type as classified in accord with transformations based on standard outputs as described herein. The transformations that the transformation components across the EM system perform are logged in this logging component as described below.

Figure 1C:
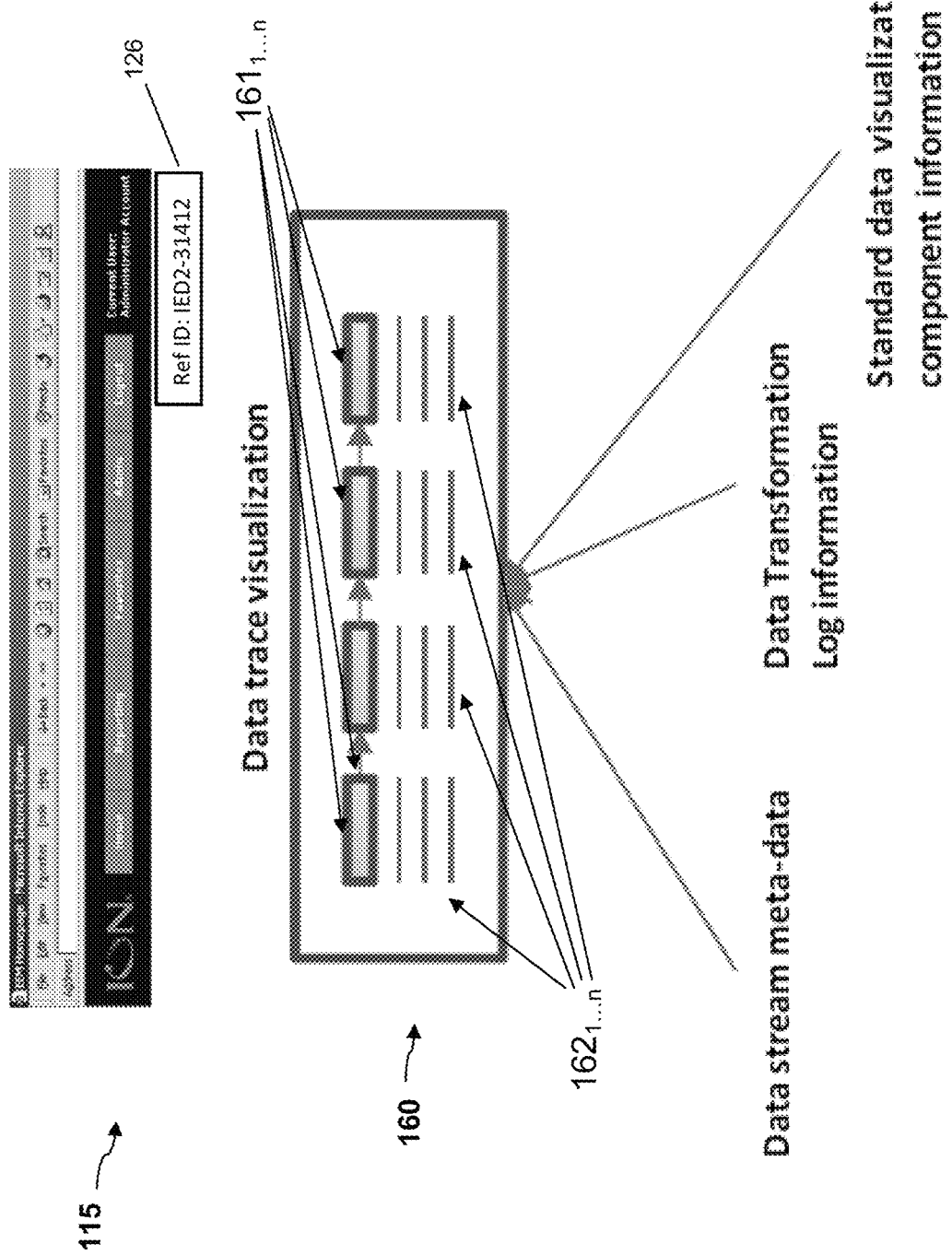

The log component 315 can be configured to include an interface to generate responses to requests about data transformations. In one embodiment, a request comprises a unique identifier for the data stream and a time range for the data stream. The response can comprise a list of components that performed operations on the data stream within the time range and a description of any data transformations, if any, as shown in FIG. 1c. Accordingly, the interface that responds to requests about data transformations can, given a request containing stream id+ time range, return a list of components that performed operations on the data stream within the specified time range(s) and describe instances of the transformations referred to herein (e.g. a VEE (Validation, Estimation and Editing)/data cleansing operation transformation, an aggregation/disaggregation transformation, an arithmetic and logical transformation, a manual modification transformation, a reclassification transformation, a packaging-related transformation, a data-management transformation, a transformation output identified after system deployment, a transformation by a custom component, and a transformation by an external system or component). For instance, a log can comprise a transformation ID that, for example, refers to a data transformation known as a "Gap Fill" which is a class of high level "VEE" type transformations as described herein.

EM Data ID Generator and Decoder Component

In another embodiment is an EM data ID generator and decoder component with a function to generate "human-friendly" IDs that refer to standard system outputs. As will be noted, the EM data IDs can be used as an input to generate a data stream trace as described herein with respect to FIG. 1c. The EM data ID generator and decoder component comprises an interface configured to generate a reference ID based on inputs comprising: a unique identifier of an EM component producing a system output; a unique name identifier that represents a content of the system output; the time the content was produced; and at least one data stream and time range for data processed by the EM component. As will be appreciated, the EM data ID generator and decoder can be located anywhere in the EM system architecture, for example as a separate module in the distributed architecture of the EM system. For example, as shown in FIG. 3b, an EM data ID generator and decoder 319 can be located in operative connection to the EM information system user interfaces 314, 318.

The EM data ID generator and decoder comprises: a decoder for decoding the reference ID into the inputs for which the EM reference data was generated. As described above, the EM data ID generator/decoder component can be configured as a service-oriented component with a primary function to generate "human-friendly" IDs that refer to standard system outputs. For example, the EM data ID generator can be configured to accept a long string of information as an input and to then produce a shortened reference as an output that can then be displayed more conveniently (e.g, via a computer display or smart phone display). For example, in one embodiment the EM data ID generator and decoder component generates a single reference ID based on input such as:
  i. the unique identifier of the component producing the system output (reporting engine, trend generator, etc),
  ii. a unique name identifier that represents the content that was generated (name or ID for the report or trend, etc.),
  iii. the time that the content was generated, and
  iv. a list of one or more data stream+ time range lists that represents the data consumed by the component producing the standard system output.

As noted above EM data ID generator and decoder component 319, upon request, can be configured to decode a reference ID into the component inputs listed above. The decoded reference can then be used by the system, for example, to build a data stream trace as described herein.

Metadata Addition

In another embodiment is disclosed a component for adding metadata to an EM data stream including: a component for adding metadata to a data stream, wherein the metadata provides information about at least one of data origin, data quality, data processing and data storage rules. Examples of metadata include: a quality flag; a device communication parameter; a data origin (e.g., information on what data is being measured); a source algorithm (e.g. details on how a data measurement is taken); and other stream metadata. The metadata can, for example, comprise stream metadata added to augment a presentation in a data path trace visualization tools. The extensible data stream metadata system includes an extensible meta-data system configured to "tag" or relate a data stream to/with additional information. Data processing and storage rules are also captured, and these may also be represented as stream metadata. Metadata can be added using data editing components as known within the ordinary skill in the art.

In disclosed embodiments stream meta-data in service of the overall quality system as described herein can be provided by devices or components that are connected to the EM system or in configuring and implementing EM system. For example, when a data stream is stored by the system, it is identified internally by a unique identifier and classified by name such as "Building B" and a measured quantity such as "kWh" and contains additional stream meta-data such as:
  Data origin: electrical feeder 33
  Measurement device: PM800
  Quality flags: suspect data time range Aug. 3, 2002 12:00:00-Aug. 3, 2002 1:00:00
  Averaging method: algorithm Y
  Stored: database 5, quality check on insertion.

The metadata may contain some data points or references to the data stream or other data. The metadata can be stored in an annotation database, energy management portal, in a web based server, and so forth in any format, and turned into the appropriate format (RDF and SVG) by processing when retrieved from the database. It will be appreciated that other specific technologies besides SVG and RDF can be used to annotate graphically presented data and contain desired metadata. In one embodiment, metadata can be altered or corrected through visualization and editing tools, such as that described below with respect to FIG. 1d and FIG. 1e.

Visualization and Editing Tools

In another embodiment is disclosed computer system and method therefor including at least one computer processor and computer readable storage medium or media including computer code and at least one storage device in which is stored EM data for a plurality of EM devices, the system comprising: a memory including an EM database including log transformation data transmitted from a plurality of EM devices; and one or more processors programmed at least to receive EM log data transmitted from a plurality of EM devices; store in the memory operatively coupled to at least one of the processors, the EM log data; analyze the EM log data to derive a data trace for a data stream; and provide, for a graphic user interface, and an interactive display configured to display a graphic representation of the data stream trace.

Referring to FIG. 3b, the system can be configured to include a visualization and editing tool 318. The system comprises: a first visualization tool to show the data stream trace; and can include at least one second tool configured to be accessible from the first visualization tool. In one embodiment, the system can comprise: an EM information system graphic user interface 314, wherein the first visualization tool is configured to be launched from (or displayed within) the EM information system graphic user interface 314.

In one embodiment the first visualization tool can also be configured as a standalone tool.

For example, the system comprises a primary visualization tool configured to show an overall data stream trace and secondary tools associated with data transformation or visualization components that can be invoked from the primary visualization tool. The primary tool can be configured to be (1) launched and/or viewed within the context of standard EM Information System visualization components (Reporting, Trending, KPI, and other user interfaces as shown in FIG. 1b) and/or (2) can be launched as a stand-alone tool which enables the user to enter a Reference ID from the Reference ID generator to access the data stream trace. Secondary tools can be configured to provide additional details and/or allow modifications to data transformation.

The graphic user interface 115 is configured to include an interface comprising: an input for a Reference ID 126 generated by a Reference ID generator, wherein the Reference ID input 126 is configured to access the data stream trace and provide a visualization thereof, shown at FIG. 1b. At least one second visualization tool is configured to at least provide additional details on a data stream, allow modifications to a data transformation, or both. When a data trace visualization is requested, the data transformation log information is retrieved from the data log component and displayed via the display tool, stream metadata is retrieved and displayed, and standard data visualization component(s) are queried to provide information on data transformation logic associated with the standard system output(s).

For example, referring to FIG. 1c, entry of a Reference ID displays a first tool 160 in, for example, screen or window of a GUI which presents a data trace visualization. The data trace visualization presents a series of data transformation graphic icons or text $161_{1...n}$ each showing an EM data transformation point (i.e., a data transformation by a data transformation component).

The system is configured to display information $162_{1...n}$ about the data stream trace $161_{1...n}$, comprising at least one of: (1) general data about a data stream through a system, and (2) data for at least one specific transformation of EM data. Data stream trace information can include, for example, a data source of the data; storage location data; and data processing information. The system can further be configured include a user interface for modification of the configuration of at least one data processing step. The modification includes at least one of: altering data stream metadata, a data cleansing function, modifying a data processing calculation, selecting an algorithm selection, modifying a data storage parameter, and modifying a data processing parameter. The system can be configured to allow an update of visualization based on the modification.

Referring to FIG. 1c, listed underneath each point $161_{1\ldots n}$ is KPI or data transformation data of interest $162_{1\ldots n}$ as described herein. For example, embodiments of the tools described above enable an operator to access information that describes the data stream trace for a standard system output, including:

i. the source of the data
ii. where data is/was stored
ii. how data was processed, and by which components
iv. for each component processing the data, the ability to see the actual calculation(s) performed, and
v. for each component processing the data, to be able to alter the configuration of the processing step(s) to correct configuration or programming errors, such as:
  alter incorrect data-stream meta-data (device or logical device name, measurement type classification, etc),
  modify data cleansing routines/schedules/coverage,
  update data processing calculations or select alternative algorithms, and
  modify data storage and processing parameters
vi. Additionally, the system can be configured to provide, for each modification of any of these parameters, the updated visualization/output/KPI (e.g., upon request).

Figure 1D:
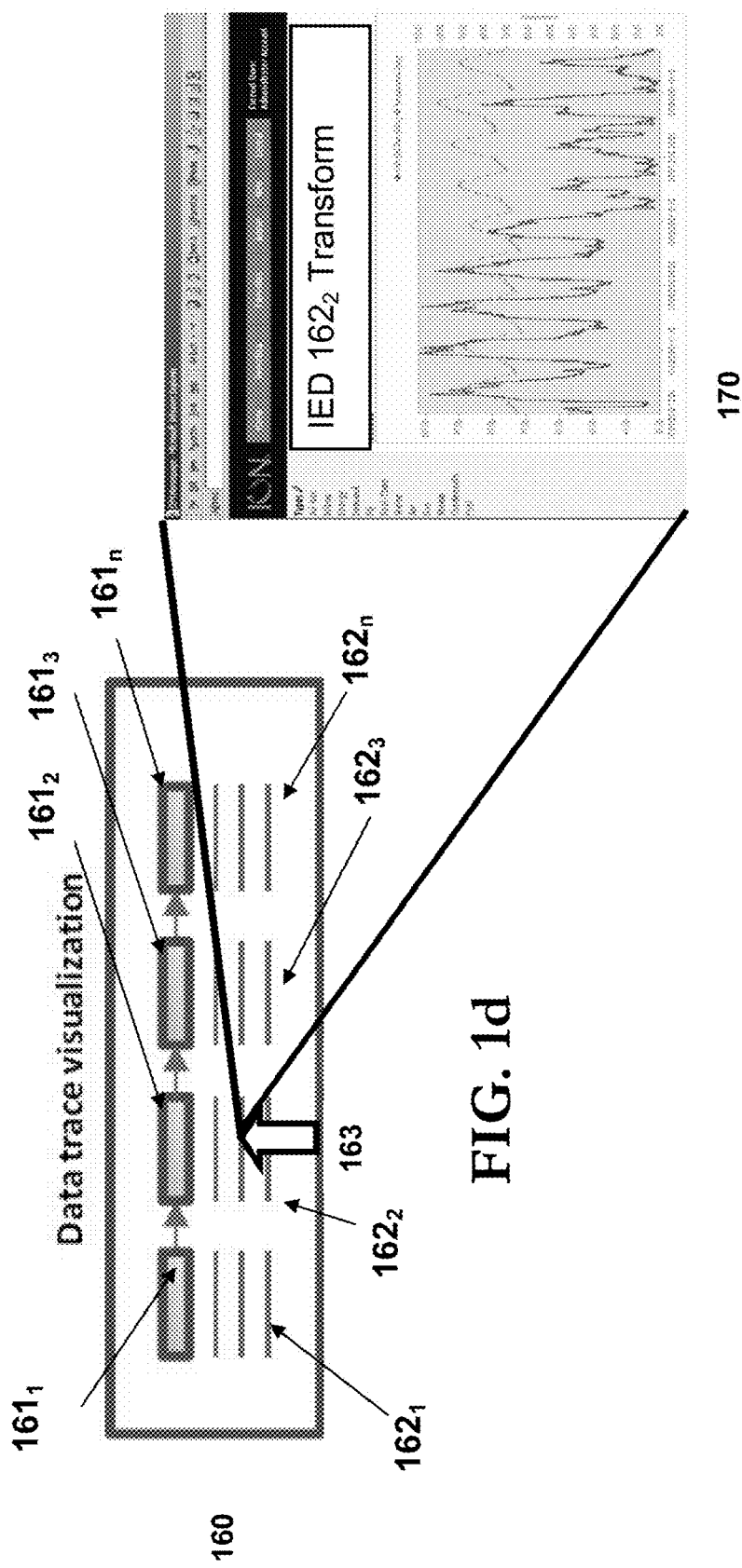

For example, referring to FIG. 1d, a second tool can be launched from the primary data trace visualization tool 160. A user, for instance, could choose an EM datapoint $161_{1\ldots n}$, for example via a mouse icon 163 moved over a datapoint $161_{1\ldots n}$ or information item $162_{1\ldots n}$ of interest, which could launch a window or screen graphic 170 that shows further detail about that EM data and/or the component that processed it. The secondary tool can also include editing functions or other inputs to allow modifications, updates, and/or corrections to EM data as described above. For example, the tool can be configured to allow the addition of metadata as described above, or to alter incorrect data stream metadata.

Accordingly, embodiments of the data trace visualization provide an interface that provides a user with a high level summary and also can display or launch secondary user interfaces. These user interfaces allow direct configuration of EM data transformation components as described herein. The user interfaces can also enable editing of other properties like data stream meta-data (e.g.: as user may enter meta-text noting: "whoops, we put the wrong machine name in for that meter—it's really on the 2nd floor and not the 3rd . . . etc.").

Extensions to Standard Data Visualization Components

In an embodiment, the extension components 302 can be configured to include visual extension components to provide EM information system user interfaces 314 that enable a user to visualize and edit system outputs of data transformation components 303, 305, 307, 309, 313. The extension components can also be configured to launch the visualization tool 318 as described herein.

As shown in FIG. 3b, in an embodiment, the system 300 comprises at least one of: at least one interface 314 for user input of a reference ID 126 to load information about a previous output and launch of visualization and editing tools 318; an interface 314 configured to regenerate at least one data output and display the data output along with a previous data output, an interface 314 displaying a visualization of a selected data output for editing; and an interface for responding to request for information about transformation logic associated with a selected output. For example, visualization and editing tools 318 can (1) show a data stream trace for the entire system, and (2) other user interfaces for making changes to the data transformation components, similar to those described with respect to FIGS. 1c-1d.

The editing and visualization tools can be launched stand-alone (and generate a trace based on the input of a reference ID) or be launched from the context of an existing EM user interface by clicking on a link for further info, a data point, a trend line, etc. The user interface that is launched can be presented within the context of the existing user interface window, or again stand alone.

User interfaces can be configured to launch from either an extension component of a transformation component or the transformation component itself. For instance, where a transformation component does not feature a user interface, the extension component can be configured to provide a user interface for the visualization and editing tools.

For example, visualization extensions to standard data visualization components 314 can be configured to:
  enable user-entry of a reference ID to load information about a previous output and launch visualization and editing tools as described herein,
  enable ability to regenerate standard system outputs and display them side-by-side with previous outputs,
  enable visualization configuration/definition to be exposed for a given standard system output, and for the configuration to be viewed and edited in the standard visualization and editing tools as described herein, and—a service-oriented interface that responds to requests from visualization and editing tools 318 as described herein for information about transformation logic associated with a given standard system output (e.g., upon input of the associated content ID or name).

The visualization extensions can be configured to present EM data calculations in an intuitive and easily readable form, regardless of the type of component that transformed the data. Moreover, data processing, configuration, and data transformation components can be modified directly via the interface to explore the impact of transformations, for example by enabling user-entry of a reference ID via a user entry input 126 to load information about a previous output and launch visualization and editing tools 318 as described herein, and enabling the ability to regenerate standard system outputs and display them side-by-side with previous output.

Figure 1E:
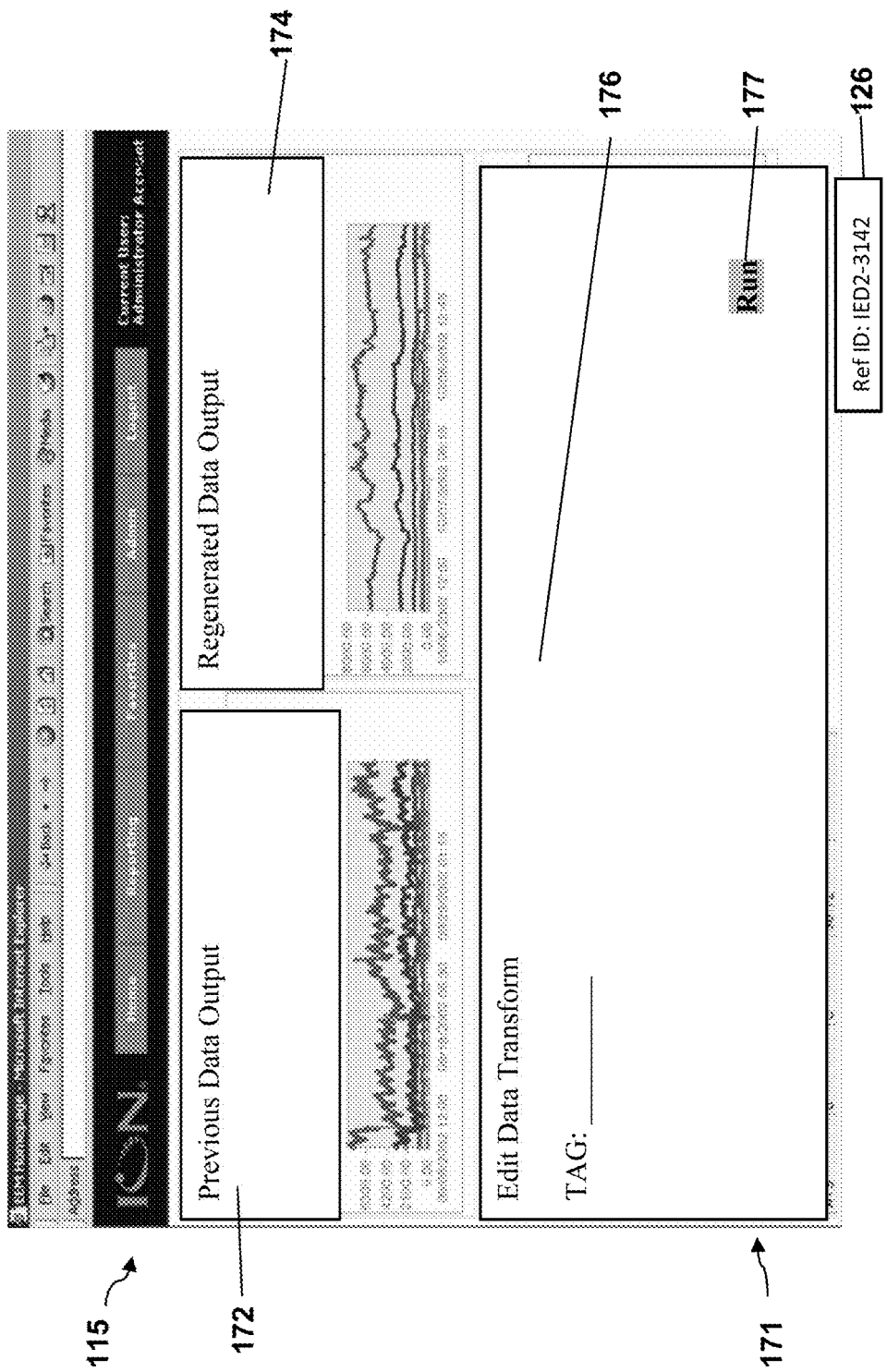

For example, as shown in FIG. 1e, a visualization tool 171 for the graphic user interface 115 provides a tool which regenerates at least one standard system output and displays the regenerated output in a display area 174. Modifications to the transformation of the data output can be modified, edited, or tagged with metadata via an editing display area 176 of the visualization tool 171 by the user. The user can then select an input to run 177 the new output in a display area 174, shown as a side by side display 172, 174 with the previous regenerated output display area 172. As will be appreciated, modifying a data output changes output throughout a datastream, as for example where changing a data output for a component can change the downstream outputs as well. Accordingly the visualization tool 171 is configured to allow a user to regenerate a data output as a simulated output to inspect the modified output before implementing the change. As such, the tool 171 is configured to allow the user to make and test adjustments prior to implementation or update.

Figure 4:
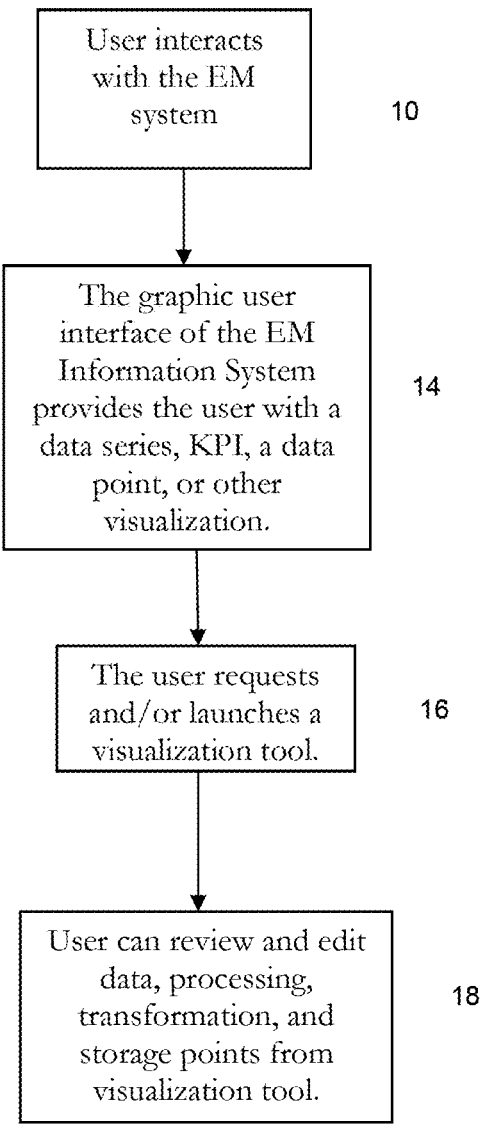
FIG. 4 illustrates an exemplary high level flow for a disclosed embodiment.

FIG. 4 illustrates exemplary high level processing of a method implemented by an EM system according to an illustrative embodiment. At block 10, a user interacts with the EM system. The user can interact either directly with the system, for example via a EM Information System user interface as described herein, or indirectly, for example via an e-mail alert. In the case of an indirect interface, an end user can be provided with an e-mail, instant message, or other such alert which includes a Reference ID generated by a data trace generator, which can be forwarded to a system operator who in turn interfaces with the system as a user. At block 14, the graphic user interface of the EM Information System provides the user with a data series, KPI, a data point, or other visualization as described herein, as for example, by a primary tool. At block 16, if the user wishes more information, the user can request and/or launch a visualization tool, which displays visuals as described above, for example, the entire data pathway for a data trace. At block 18, from the visualization tool the user can review and edit data, processing, transformation, and storage points as described herein.

While the invention has been described and illustrated with reference to certain preferred embodiments herein, other embodiments are possible. Additionally, as such, the foregoing illustrative embodiments, examples, features, advantages, and attendant advantages are not meant to be limiting of the present invention, as the invention may be practiced according to various alternative embodiments, as well as without necessarily providing, for example, one or more of the features, advantages, and attendant advantages that may be provided by the foregoing illustrative embodiments or otherwise understood in view of the disclosure and/or that may be realized in some embodiments thereof.

Systems, modules and components described herein may comprise software, firmware, hardware, or any combination(s) of software, firmware, or hardware suitable for the purposes described herein. Software and other modules may reside on servers, workstations, personal computers, computerized tablets, PDAs, and other devices suitable for the purposes described herein. Software and other modules may be accessible via local memory, via a network, via a browser or other application in an ASP context, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, command line interfaces, and other interfaces suitable for the purposes described herein. Except to the extent necessary or inherent in the processes themselves, no particular order to steps or stages of methods or processes described in this disclosure, including the Figures, is implied. In many cases the order of process steps may be varied, and various illustrative steps may be combined, altered, or omitted, without changing the purpose, effect or import of the methods described.

Accordingly, while the invention has been described and illustrated in connection with preferred embodiments, many variations and modifications as will be evident to those skilled in this art may be made without departing from the scope of the invention, and the invention is thus not to be limited to the precise details of methodology or construction set forth above, as such variations and modification are intended to be included within the scope of the invention. Therefore, the scope of the appended claims should not be limited to the description and illustrations of the embodiments contained herein.

What is claimed is:

1. A system comprising:
one or more intelligent electronic devices (IEDs) coupled to respective loads and configured to monitor and report various types of energy data related to the loads; and
one or more extension components coupled to the IEDs and configured to: (a) generate a data transformation record of a data transformation of the energy data by a data transformation component of the system, the data transformation record comprising a unique identifier for a data stream and a time range over which the data transformation is performed; and (b) send the data transformation record to a logging database component of the system,
wherein the one or more extension components are configured to be operatively connected to the data transformation component of the system to provide for traceability and inspection of the transformed energy data, and
wherein the one or more extension components further comprise:
an interface configured to receive a request to regenerate a data stream of the transformed energy data; and
regenerate the requested data stream; and
wherein the IEDs are configured to control one or more parameters associated with the loads based on the transformed energy data.

2. The system of claim 1, wherein the one or more extension components further comprise:
the interface configured to output a new data stream.

3. The system of claim 1, wherein the one or more extension components further comprise:
an interface configured to accept user input and enable a user to modify a data transformation performed by the data transformation component.

4. The system of claim 3, further comprising:
the interface being configured to enable a user to reconfigure the data transformation component.

5. The system of claim 3, further comprising:
the interface being configured to enable a user to edit the data transformed by the data transformation component.

6. The system of claim 3, further comprising:
the interface being configured to respond to a request regarding operational activity of the data transformation component.

7. The system of claim 3, further comprising:
the interface being configured to respond to a request for at least one of (1) a name of the data transformation component (2) a purpose of the data transformation component, (3) software information, (4) diagnostic information, and (5) status information.

8. The system of claim 1, further comprising:
a data trace ID generator and decoder component comprising:
an interface configured to generate a reference ID configured to be used as an input to request a data trace comprising:
a unique identifier of an energy management (EM) component producing a system output;

a unique name identifier that represents a content of the system output;
a time at which the content was produced; and
at least one data stream and at least one corresponding time range over which the at least one data stream is transformed for data processed by the EM component.

9. The system of claim 8, wherein the data trace ID generator and decoder component comprises:
a decoder for decoding the reference ID into the inputs to build the data trace.

10. The system of claim 9, wherein the system comprises:
a first visualization tool to show the data trace;
at least one second visualization tool configured to be accessible from the first visualization tool.

11. The system of claim 10, wherein the system comprises at least one of:
an interface for user input of a reference ID to load information about a previous output and launch visualization and editing tools;
an interface configured to regenerate at least one data output and display the at least one data output along with a previous data output;
an interface displaying a visualization of a selected EM data output for editing; and
an interface for responding to a request for information about transformation logic associated with a selected output.

12. The system of claim 10, wherein the first visualization tool is a stand-alone tool.

13. The system of claim 10 wherein the graphic user interface is configured to include an interface comprising:
a Reference ID input generated by a Reference ID generator, wherein the Reference ID input is configured to access the data trace.

14. The system of claim 10, wherein the at least one second visualization tool is configured to at least provide additional details on a data stream, allow modifications to a data transformation, or both.

15. The system of claim 9 wherein the system is configured to display information about the data trace, comprising at least one of:
general EM data about a data stream through an EM system, and
EM data for at least one specific transformation of EM data.

16. The system of claim 9, wherein the system is configured include an interface for modification of the configuration of at least one data processing step.

17. The system of claim 16, wherein the modification includes at least one of:
altering data stream metadata;
modifying a data cleansing function;
modifying a data processing calculation;
selecting an algorithm selection;
modifying a data storage parameter; and
modifying a data processing parameter.

18. The system of claim 17, wherein the system is configured to allow an update to a visualization based on the modification.

19. The system of claim 1, wherein the TED implements an energy management function that is able to: (a) respond to, implement and/or generate energy management functions, (b) measure energy consumption, (c) control energy distribution, (d) monitor power quality, (e) measure energy parameters, and (f) control electrical power flow and load shedding or combinations thereof.

20. The system of claim 1, wherein the loads draw electrical power for a power distribution system.

* * * * *